United States Patent

[11] 3,571,806

[72] Inventors David Makie;
Eugene E. Mallar, Jr.; Robert F. Steen, Raleigh, N.C.
[21] Appl. No. 792,221
[22] Filed Jan. 14, 1969
[45] Patented Mar. 23, 1971
[73] Assignee International Business Machines Corporation
Armonk, N.Y.

[54] VARIABLE-SPEED LINE ADAPTER FOR SYNCHRONOUS TRANSMISSIONS
5 Claims, 2 Drawing Figs.

[52] U.S. Cl. .......... 340/172.5,
[51] Int. Cl. .......... H04l 25/50
[50] Field of Search .......... 340/172.5; 235/157; 307/269

[56] References Cited

UNITED STATES PATENTS
3,337,855 8/1967 Richard et al. .......... 340/172.5

*Primary Examiner*—Raulfe B. Zache
*Attorneys*—Hanifin & Jancin and Delbert C. Thomas

ABSTRACT: A line adapter for data transmission systems is provided with a pair of oscillators for enabling reception of signals at two different rates. An initial synchronizing character is analyzed to determine the number of voltage transitions during the period needed for transmission of the character at the higher transmission rate. If the number of transitions counted does not correspond with the number of voltage transitions in the character, a shift is made to a lower speed oscillator for data reception at the slower rate.

Figure 1:
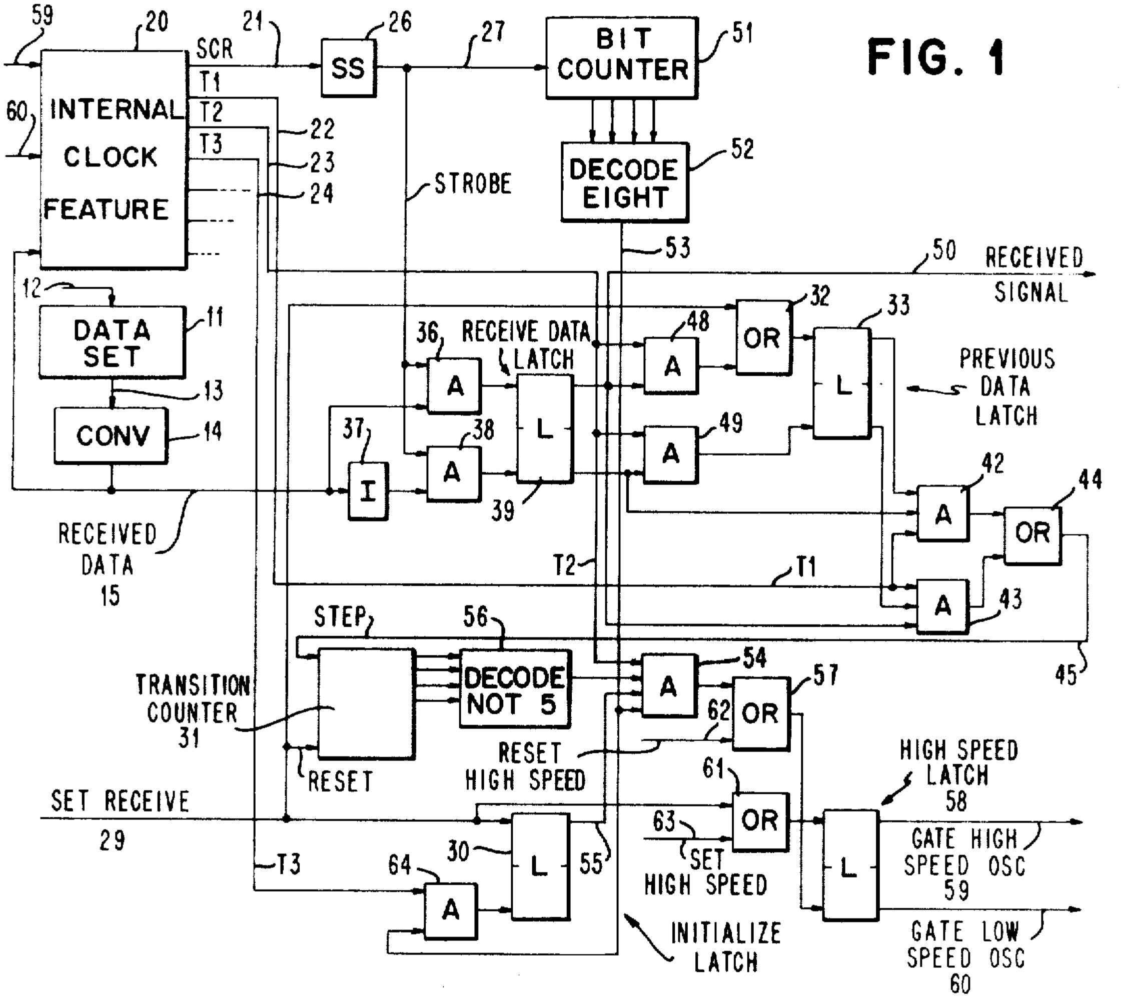

INVENTORS
DAVID MACKIE
EUGENE E. MALLAR, JR.
ROBERT F. STEEN

BY Delbert C. Thomas
ATTORNEY

VARIABLE-SPEED LINE ADAPTER FOR SYNCHRONOUS TRANSMISSIONS

This invention relates to a multiple speed line adapter and more particularly to one which is automatically responsive to a data signal to switch to a correct reception rate.

Line adapters for data transmission are well known and broadly function to convert data received from a data set into a form suitable for use in a data processing machine. Previously such line adapters have been restricted to a single speed of transmission and required physical modification before they could be used at another speed. Some large Transmission Control Units (TCU) such as the Model 2702 and Model 2703 TCU's produced by the assignee of this application have a plurality of oscillators for different speeds and can select any one for a particular line, see for example FIGS. 67—71 of assignees U.S. Pat. No. 3,337,855 issued Aug. 22, 1967 to W. H. Richard, et al. In effect, however, each line terminal is restricted to a single speed of transmission since a physical or program change is required to set a new line speed for the terminal.

Data communication networks are continuously increasing in size and many networks now comprise widely distributed terminals which can connect to a data processor with a line adapter input through the conventional telephone switched network. For maximum flexibility, it is desirable that any terminal should be connectable through any line adapter. Since the network may have terminals of different speed, this requires that the line adapters must be capable of automatically adjusting to the transmission speed of the calling terminal.

OBJECTS

It is therefore an object of the present invention to provide a line adapter which is normally set for data reception at one speed and is automatically responsive to receipt of data at a different speed to select a data-decoding speed appropriate to the received data.

Another object is the provision of a line adapter having a plurality of data-sampling speed control circuits with means responsive to received data for selecting an appropriate one of said speed control circuits.

It is also an object to provide a line adapter having a character scanning circuit to inspect a known character being transmitted at an unknown speed and effective to set the line adapter clock speed to match said unknown speed.

Still another object of the invention is to supply a line adapter with a plurality of receive clock circuits and to render effective a selected one of the receive clocks circuits in accordance with the results of a test on the initial data received from a terminal having an unknown transmission speed.

The foregoing and other objects, features and advantages of the invention will be apparent from the following more particular description of a preferred embodiment of the invention, as illustrated in the accompanying drawings.

DRAWINGS

Figure 2:
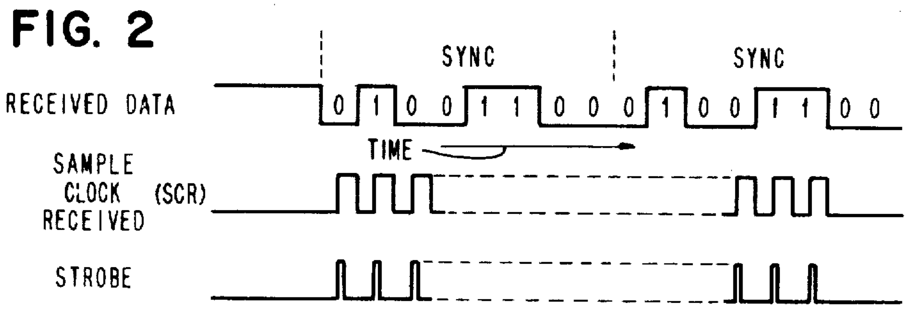

In the drawings:

FIG. 1 is a diagrammatic showing of the essential parts of the circuit of the adjustable speed line adapter; and FIG. 2 is a group of graphs showing the timing relationships within the line adapter.

DESCRIPTION

In the preferred embodiment of the invention as diagrammed in FIG. 1, a data set 11 receives data signals on an input terminal 12. The data set 11 may be a conventional type such as the Western Electric type 202 or its equivalent which converts audio signals received on its input to a binary data signal on its output 13. The input terminal 12 of data set 11 can be connected to an output of the commercial switched communication network and is therefore accessible to a plurality of data transmission terminals of at least two different transmission speeds. The voltage levels of the data signal on output 13 are not suitable for data processing machines and are converted in a converter 14 to the proper polarity and voltage on the received data line 15.

The line adapter of this embodiment may be similar to that of the commercial IBM Model 2701 Transmission Control Unit with the Synchronous Data Adapter Type 11 (SDA 11) and having the Internal Clock feature option. In this adapter, the internal clock feature 20 contains an oscillator for each transmission speed to be received and the usual counter with timing circuit outputs. Each oscillator will cycle at a multiple of its nominal transmission rate and one oscillator will be connected to operate the counter whose stages will be decoded to generate the needed timing signals. The usual synchronizing circuits will be included to adjust the counter to maintain synchronization with received data on line 15. The internal clock feature 20 will generate the Sample Clock Received signals on its output line 21 with the timing shown on the second line of FIG. 2, i.e. the SCR signal will have a positive transition at the center of each bit signal interval and a negative transition near the end of the bit signal interval of the received data. The internal clock feature 20 will also provide the timing T1, T2, T3, etc. signals at 1, 2, and 3 or more oscillator cycles respectively after the start of each bit signal interval on lines 22, 23, and 24 respectively. Each positive signal transition on SCR line 21 activates a single shot 26 which generates signal strobe pulses on line 27 as indicated on the third line of FIG. 2. The internal clock feature will be activated to start its clock cycle by the initial voltage transition on received data line 15.

To make an automatic selection of the proper oscillator of the internal clock feature to be used for clocking of data from a terminal, the first transmitted character is analyzed. Initially, the line adapter is set to receive condition by a signal on the line 29 whenever the connected data processor expects data to be transmitted to it, e.g. whenever data set 12 is connected to the switched network. This signal on line 25 will set the initialize latch 30 to a set condition, will zeroize the transition counter 31 and through OR 32 will set the previous data latch 33 to the rest condition of the transmission line, i.e. a "mark" or one condition as indicated on line 1 of FIG. 2. Standard procedure requires that in synchronous systems, the first signals transmitted over the line must be several of the eight-bit synchronizing characters 0011 0010 with the low order transmitted first as on the first line of FIG. 2. It will be noted that in the first sync character, there are five voltage transitions. The first of these transitions will start the internal clock feature to generate the strobe signals on line 27 and since the first signal is a zero with a low voltage level on line 15, the signal input to AND 36 is low while the complementary signal input from inverter 37 to AND 38 is high. The strobe pulse on line 27 will then pass through AND 38 to set the receive data latch 39 to a zero indication. At the succeeding T1 time, the signal on line 22 will gate AND 42 to pass a signal if the receive data latch 39 and the previous data latch 33 are set at zero and one respectively and will gate AND 43 to pass a signal if the latches are set at one and zero respectively. The outputs of AND's 42 and 43 are combined in OR 44 to put a signal on line 45 whenever the states of the two latches 39 and 33 are different, i.e. whenever there has been a data transition. The number of transitions is counted by the transition counter 31.

At T2 time, after the data transition, if any, has been counted, the state of the receive data latch 39 is transferred to the previous data latch 33. AND's 48 and 49 receive the upper (mark) and lower (space) outputs of the receive data latch 39 and when gated by the T2 signal on line 23 transfer the setting of this latch into the OR 32 on the set mark input of latch 33 or to the set space input of the latch 33. The state of the upper output of the receive data latch is transmitted out on a line 50 as the received signal.

To determine the transmission speed of the incoming data, the strobe pulses on line 27 are counted in a counter 51 which has a decoder 52 on its outputs to give a signal on line 53 when the counter reaches eight, the signal indicating that if the selected transmission speed is correct, the last bit of the initial synchronizing character has been received. An AND circuit 54 receives the eighth bit signal on line 53, the initial character signal on line 55 from the initialize latch, the T2 signal on line 23 and a not 5 signal from the decoder 56 on the outputs of the transition counter 31. AND 54 will therefore generate an output signal at T2 time if the first received character does not have five signal-level transitions and this output signal through OR 57 will reset a high-speed latch 58 to drop the signal on its high-speed oscillator gating output 59 and raise the signal on its low-speed oscillator gating line 60. Lines 59 and 60 are inputs to the internal clock feature 20 and determine which of the oscillators therein will be effective to control the clock signals. Latch 58 is initially set to gate the high-speed oscillator by the signal on line 29 through an OR 61 to its setting input. Additional inputs 62 and 63 to the OR's 57 and 61 respectively can be activated to select the oscillator to be effective in the internal clock feature for other functions, as for example data transmission to a connected terminal. At T3 time after the bit counter 51 has reached a count of eight, the initialize latch 30 is reset by the T3 and bit eight count signals on lines 24 and 53 respectively passing through AND 64 to the reset input of latch 30. This degates AND 54 and prevents a later character from altering the setting of the high-speed latch 58.

Although the description above is restricted to selection of only one slower speed oscillator, it will be evident that with the provision of additional gates such as 58, and separate decoders on the outputs of transition counter, any one of a plurality of transmission speeds can be selected. For such selection it is only necessary that each different transmission speed have a distinct number of transitions during the test interval so as to be distinguishable from the others. It is also contemplated that oscillator switching may be performed in a series of steps with each slower speed being selected on succeeding characters until the correct number of transitions are counted. It is to be understood that each lower transmission speed must be sufficiently slower than the next higher transmission speed so that the slower speed character will not have the full number of signal transitions during the testing period.

While the invention has been particularly shown and described with reference to a preferred embodiment thereof, it will be understood by those skilled in the art that the foregoing and other changes in form and details may be made therein without departing from the spirit and scope of the invention.

We claim:

1. In a line adapter for data transmission systems in which any of a plurality of different transmission speed terminals may transmit data to said line adapter and in which each data transmission is preceded by one or more signal groups representing a predetermined character a plurality of clock controlling circuits, one for each transmission speed to be received by said line adapter, selecting means for said clock controlling circuits, means initially activated to cause selection of one of said clock-controlling circuits cyclic timing circuits for said line adapter set into action by a first character signal from a terminal, means controlled by said timing circuits to detect a signal level transition in the received data, means to count said signal level transitions found by said detecting means, an interval timer responsive to said timing circuits to indicate the end of the time interval needed for receipt of a predetermined character at the initially selected transmission speed and control means to change said selecting means for said clock control circuits to select a different clock control circuit when the number of signal level transitions which have been counted when the end of the time interval is indicated is different from the actual number of transitions in said predetermined character said initially activated means also being operative to restore said level transition counter to an initial condition.

2. A line adapter as in claim 1 in which said signal level transition detecting means includes a pair of bit storage devices, means controlled by said timing circuits to periodically set a first of said storage devices in accordance with the level of the received data signal, transfer means also controlled by said timing circuits to transfer the setting of said first storage device to the other of said storage devices, and in which said means to detect a signal level transition comprises circuits to detect a difference in the set states of said storage devices.

3. A line adapter for data transmission systems in which any of plurality of different transmission speed terminals may transmit to said line adapter and in which each data transmission is preceded by one or more signal groups representing a predetermined character, said line adapter comprising a cyclic timing means including a plurality of oscillator circuits, one for each transmission speed to be received, an oscillator selection means to select one of said oscillator circuits for control over said cyclic timing means, initializing means to set said selecting means to one condition, a timer activating circuit to initiate operation of said timing means at the start of reception of signals from a terminal, bit sampling means controlled by said cyclic timing means, a shift register responsive to said bit sampling means and said timing means to store indications of at least the last two data samples, signal transition means to compare the states of the stored indications to detect the occurrence of a transition in said signal, a signal transition counter to count the transitions detected by said signal transition means, a character interval detector driven by said bit sampling means to indicate when enough time has passed for a predetermined character to have been received and means controlled by said cyclic timing means, said transition counter and said character interval detector to activate said oscillator selection means to cause selection of a different oscillator circuit if the number of signal transitions counted during the first character interval does not correspond to the number of transitions in said predetermined character.

4. A line adapter for receiving data transmissions of at least two different speeds, said adapter comprising a timing means for determining bit sampling times, said timing means including at least a pair of oscillator circuits, one for each transmission speed and oscillator selection means initially set to select one oscillator circuit to control the operation rate of said timing means, a received data circuit to initiate operation of said timing means at the start of reception of data transmission, a two stage shift register controlled by said timing means to receive data bit samples from said received data circuit, a transition counter driven whenever the successive data bit samples stored in said shift register are different, a sample counter driven by said timing means to count the number of data bit samples, a character end decoder sampling said sample counter and signaling when sufficient time has elapsed to allow receipt of a character at a first transmission rate and an oscillator selection control circuit responsive to said character end decoder, said transition counter and said timing means to set said oscillator selection means to select another oscillator circuit when the initially selected oscillator circuit is not operating at the transmission speed of the first received character.

5. The line adapter as set out in claim 4 including an adapter initializing circuit activated in advance of reception of a data transmission to reset said transition counter and said shift register, to initially set said oscillator selection means to select a predetermined one of said oscillator circuits and to set an initialize latch which frees the oscillator selection control circuit to change the initial setting of said oscillator selection means and a circuit controlled by said character end decoder and said timing means to reset said initialize latch to thereafter retain the selected one of said oscillator circuits in control of said timing means.